US012681340B2

(12) United States Patent
Chen et al.

(10) Patent No.: US 12,681,340 B2
(45) Date of Patent: Jul. 14, 2026

(54) ELECTRO-OPTIC MODULATOR, OPTICAL CHIP, AND INTEGRATED CHIP

(71) Applicant: HUAWEI TECHNOLOGIES CO., LTD., Guangdong (CN)

(72) Inventors: Hongmin Chen, Shenzhen (CN); Mengdie Sun, Wuhan (CN); Xin Chen, Wuhan (CN); Fusheng Tang, Shenzhen (CN); Haifeng Shao, Wuhan (CN); Lei Zhao, Wuhan (CN); Lei Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 545 days.

(21) Appl. No.: 18/070,566

(22) Filed: Nov. 29, 2022

(65) Prior Publication Data

US 2023/0107837 A1 Apr. 6, 2023

Related U.S. Application Data

(63) Continuation of application No. PCT/CN2020/093632, filed on May 30, 2020.

(51) Int. Cl.
*G02F 1/035* (2006.01)
*G02F 1/225* (2006.01)

(52) U.S. Cl.
CPC .......... *G02F 1/0356* (2013.01); *G02F 1/2255* (2013.01); *G02F 2201/127* (2013.01)

(58) Field of Classification Search
CPC ........ G02F 1/035; G02F 1/0356; G02F 1/225; G02F 1/2255; G02F 2203/21

(Continued)

(56) References Cited

U.S. PATENT DOCUMENTS

| | | | | |
|---|---|---|---|---|
| 4,553,810 A | * | 11/1985 | Alferness | G02F 1/0356 |
| | | | | 385/132 |
| 6,580,840 B1 | * | 6/2003 | McBrien | G02F 1/2255 |
| | | | | 385/2 |

(Continued)

FOREIGN PATENT DOCUMENTS

| | | |
|---|---|---|
| CN | 104885004 A | 9/2015 |
| CN | 110609399 A | 12/2019 |

(Continued)

OTHER PUBLICATIONS

Chinese Office Action issued in Chinese Application No. 202080098076.6 dated Nov. 29, 2024.

(Continued)

*Primary Examiner* — Robert Tavlykaev

(57) ABSTRACT

An electro-optic modulator is disposed on a surface of a substrate including: an optical waveguide layer disposed on the substrate, a modulation electrode disposed on the optical waveguide layer, and a metal electrode disposed on the modulation electrode and electrically connected to the modulation electrode. A first end of the metal electrode is coupled to a radio frequency driver, and receives a modulation signal input by the radio frequency driver. The modulation electrode is configured to perform electro-optic modulation on the optical waveguide layer based on the modulation signal. A second end of the metal electrode is coupled to a direct-current voltage end, and the direct-current voltage end is configured to input a voltage signal and provide a bias voltage for the radio frequency driver by using the metal electrode. This reduces costs and a size of the electro-optic modulator, and is conducive to device miniaturization.

17 Claims, 5 Drawing Sheets

(58) Field of Classification Search
 USPC ........................................................... 385/1–3
 See application file for complete search history.

(56) References Cited

U.S. PATENT DOCUMENTS

| | | | | |
|---|---|---|---|---|
| 9,563,100 | B2 * | 2/2017 | Masuyama | ............. G02F 1/025 |
| 9,746,743 | B1 * | 8/2017 | Rabiei | ............... G02B 6/12009 |
| 9,835,927 | B2 * | 12/2017 | Velthaus | ............... G02F 1/2255 |
| 10,466,567 | B1 * | 11/2019 | Vera Villarroel | ..... G02F 1/2255 |
| 10,534,239 | B2 * | 1/2020 | Tanaka | .................. G02F 1/2257 |
| 11,874,497 | B2 * | 1/2024 | Yang | ....................... G02F 1/035 |
| 2002/0071622 | A1 | 6/2002 | Betts et al. | |
| 2003/0053730 | A1 | 3/2003 | Seino | |
| 2015/0316796 | A1 * | 11/2015 | Gill | ......................... G02F 1/225 |
| | | | | 385/2 |
| 2016/0363834 | A1 | 12/2016 | Velthaus et al. | |
| 2018/0180965 | A1 * | 6/2018 | Goi | ...................... G02F 1/2255 |
| 2018/0341164 | A1 * | 11/2018 | Williams | ............. G02F 1/2257 |
| 2020/0064707 | A1 * | 2/2020 | Vitic | ...................... G02F 1/2257 |
| 2020/0073197 | A1 * | 3/2020 | Liu | .......................... G02F 1/011 |
| 2020/0081314 | A1 | 3/2020 | Parvizi et al. | |
| 2021/0080798 | A1 * | 3/2021 | Kissa | ................... G02F 1/2255 |

FOREIGN PATENT DOCUMENTS

| | | | |
|---|---|---|---|
| JP | H09218384 | A | 8/1997 |
| JP | 2004004589 | A | 1/2004 |
| JP | 2007010942 | A | 1/2007 |
| JP | 2014071352 | A | 4/2014 |
| JP | 2016194544 | A | 11/2016 |
| JP | 2017219587 | A | 12/2017 |
| WO | 2019039215 | A1 | 2/2019 |
| WO | 2021142588 | A1 | 7/2021 |

OTHER PUBLICATIONS

Satoshi Oikawa et al, Zero-Chirp Broadband Z-Cut Ti:LiNbO3 Optical Modulator Using Polarization Reversal and Branch Electrode, Journal of Lightwave Technolooy, vol. 23, No. 9, Sep. 2005, 5 pages.

Cheng Wang et al, Integrated lithium niobate electro-optic modulators operating at CMOS-compatible voltages, Letter, Oct. 4, 2018, 12 pages.

Cheng Wang et al, Ultrahigh-efficiency wavelength conversion in nanophotonic periodically poled lithium niobate waveguides, Letter, vol. 5, No. 11, Nov. 2018, Optica, 4 pages.

International Search Report and Written Opinion issued in PCT Application No. PCT/CN2020/093632 dated Mar. 4, 2021.

Japanese Office Action with English translation issued in Japanese Application No. 2022-573431 dated Feb. 6, 2024.

Japanese Office Action with English translation issued in Japanese Application No. 2022-573431 dated Jun. 11, 2024.

Extended European Search Report issued in EP Application No. 20938876.8 dated May 30, 2023.

\* cited by examiner

ELECTRO-OPTIC MODULATOR, OPTICAL CHIP, AND INTEGRATED CHIP

CROSS-REFERENCE TO RELATED APPLICATIONS

This application is a continuation of International Application No. PCT/CN 2020/093632, filed on May 30, 2020, the disclosure of which is hereby incorporated by reference in its entirety.

TECHNICAL FIELD

Embodiments of this application relate to the field of electro-optic modulation, and in particular, to an electro-optic modulator, an optical chip, and an integrated chip.

BACKGROUND

As optical communications technology develops, application of optical networks in communication becomes more popular. For example, increasingly more users are adopting optical fiber broadband to surf the Internet. When a user adopts optical fiber broadband to surf the Internet, an electro-optic modulator needs to be deployed. The electro-optic modulator may be configured to modulate an optical signal with an electrical signal.

In one existing electro-optic modulator, a driving mode of a modulation electrode design adopts a manner of single-end alternating-current coupling. Peripheral circuits such as a capacitor and an inductor need to be disposed for signal processing. The resulting, a structure is complex, size is relatively large, and costs are high, which are not conducive to component miniaturization.

SUMMARY

Embodiments of this application provide an electro-optic modulator, an optical chip, and an integrated chip, to resolve electro-optic modulator problems of a complex peripheral circuit, high costs and a large size.

To achieve the foregoing objective, this application adopts the following technical solutions. According to a first aspect of the embodiments of this application, an electro-optic modulator is provided. The electro-optic modulator is disposed on a surface of a substrate. The electro-optic modulator includes an optical waveguide layer disposed on the substrate, a modulation electrode disposed on the optical waveguide layer, and a metal electrode disposed on the modulation electrode and electrically connected to the modulation electrode. A first end of the metal electrode is coupled to a radio frequency driver. The metal electrode is configured to receive a modulation signal input by the radio frequency driver. The modulation electrode is configured to perform electro-optic modulation on the optical waveguide layer based on the modulation signal. A second end of the metal electrode is coupled to a direct-current voltage terminal, and the direct-current voltage terminal is configured to input a voltage signal, and provide a bias voltage for the radio frequency driver by using the metal electrode. In this way, the modulation electrode is electrically connected to a signal output end of the radio frequency driver by using the metal electrode, and may receive, by using the metal electrode, a voltage signal that is input from the direct-current voltage terminal. In addition, the metal electrode is coupled to the direct-current voltage terminal, so that the metal electrode can be multiplexed to supply power to the radio frequency driver. The electro-optic modulator multiplexes the metal electrode, and supplies power to a driver of the electro-optic modulator through open-circuit direct-current coupling. A complex peripheral circuit does not need to be disposed, which reduces costs and a size of the electro-optic modulator, and is conducive to device miniaturization.

In an optional implementation, the optical waveguide layer includes an electro-optic crystal layer parallel to the substrate. The modulation electrode and a ridge waveguide are disposed on a side that is of the electro-optic crystal layer and that is away from the substrate. The modulation electrodes are disposed on two sides of the ridge waveguide. The modulation electrodes are configured to perform electro-optic modulation on a light wave transmitted by the ridge waveguide. In this way, a capacitor may be formed between the modulation electrodes. An electric field may be formed through capacitor coupling, to perform electro-optic modulation on the light wave transmitted by the ridge waveguide.

In an optional implementation, the electro-optic modulator further includes an insulation layer disposed on the surface of the substrate. The optical waveguide layer and the modulation electrode are located in the insulation layer. An opening is disposed on the insulation layer on a surface of the modulation electrode, and the metal electrode is formed at the opening. In this way, the modulation electrode is disposed in the insulation layer, to avoid a short circuit of the modulation electrode.

In an optional implementation, the optical waveguide layer includes a first branch and a second branch that are symmetrically disposed. An input end of the first branch is coupled to an input end of the second branch, and an output end of the first branch is coupled to an output end of the second branch. A first end of the modulation electrode is coupled to the input ends of the first branch and the second branch, and a second end of the modulation electrode is coupled to the output ends of the first branch and the second branch. The first end of the modulation electrode is coupled to the signal output end of the radio frequency driver, the second end of the modulation electrode is connected to a terminal resistor, and the second end of the modulation electrode is coupled to the direct-current voltage terminal. A phase of an optical signal that is output from the first branch is opposite to a phase of an optical signal that is output from the second branch. In this way, a push-pull modulation scheme is implemented, and modulation efficiency is improved.

In an optional implementation, the modulation electrode includes a first electrode pair and a second electrode pair, where the first electrode pair is symmetrically disposed on two sides of the first branch, and the second electrode pair is symmetrically disposed on two sides of the second branch. In this way, the first electrode pair and the second electrode pair may separately perform modulation with the first branch and the second branch. In addition, the modulation electrode adopts a symmetrical structure, so that chirp-free modulation can be implemented, and transmission quality of a signal can be ensured.

In an optional implementation, a first end of the first electrode pair is connected to the signal output end of the radio frequency driver. A second end of the first electrode pair is connected to a first end of the second electrode pair. A second end of the second electrode pair is connected to the direct-current voltage terminal. The first branch and the second branch each include a first part and a second part. The first part of the first branch is opposite to the first part of the second branch, and the second part of the first branch is opposite to the second part of the second branch. The first electrode pair is disposed on two sides of the first part of the first branch, and the second electrode pair is disposed on two sides of the second part of the second branch. A polarization direction of the first branch is opposite to a polarization direction of the second branch. A direction of an electric field applied to the first branch by the first electrode pair is the same as a direction of an electric field applied to the second branch by the second electrode pair. Therefore, during working, a radio frequency signal is first loaded onto the first electrode pair of the electro-optic modulator by using the signal output end of the radio frequency driver, and then loaded onto the second electrode pair of the electro-optic modulator. The first electrode pair and the second electrode pair are connected in series, so that the direction of the electric field applied to the first branch by the first electrode pair is the same as the direction of the electric field applied to the second branch by the second electrode pair. The polarization direction of the first branch is opposite to the polarization direction of the second branch, so that a phase of an optical signal finally output from the first branch is opposite to a phase of an optical signal finally output from the second branch. Therefore, a push-pull modulation scheme is implemented without introducing a peripheral circuit, so that modulation efficiency is improved, and a size of an electro-optic modulator is reduced.

In an optional implementation, the modulation electrode further includes a third electrode pair. A first end of the first electrode pair is connected to the signal output end of the radio frequency driver, and a second end of the first electrode pair is connected to a first end of the second electrode pair. A first end of the third electrode pair is connected to a second end of the second electrode pair, and a second end of the third electrode pair is connected to the direct-current voltage terminal. The first branch and the second branch each include a first part, a second part, and a third part that are distributed in an S shape and that are parallel to each other, where the second part is located between the first part and the third part. The first electrode pair is disposed on two sides of the first part of the first branch, the second electrode pair is disposed on two sides of the second part of the second branch, and the third electrode pair is disposed on two sides of the third part of the first branch. A direction of an electric field applied to the first branch by the first electrode pair is opposite to a direction of an electric field applied to the second branch by the second electrode pair. A direction of an electric field applied to the first branch by the third electrode pair is opposite to the direction of the electric field applied to the second branch by the second electrode pair. A polarization direction of the first branch is the same as a polarization direction of the second branch. Therefore, during working, a radio frequency signal is first loaded onto the first electrode pair of the electro-optic modulator by using the signal output end of the radio frequency driver, and an electric field is not loaded onto the first part of the second branch. Then, an optical path and an electric field go through a 180° turn with a modulation arm, so that the radio frequency signal is loaded onto the second electrode pair of the electro-optic modulator. In this case, an electric field is not loaded onto the second part of the first branch. Then, the optical path and the electric field go through a 180° turn again with the modulation arm, so that the radio frequency signal is loaded onto the third electrode pair of the electro-optic modulator. An electric field is not loaded onto the third part of the second branch. Therefore, a direction of an electric field of the first electrode pair is opposite to a direction of an electric field of the second electrode pair, and a direction of an electric field of the third electrode pair is opposite to the direction of the electric field of the second electrode pair. The polarization direction of the first branch is the same as the polarization direction of the second branch, so that a phase of an optical signal finally output from the first branch is opposite to a phase of an optical signal finally output from the second branch. Therefore, a push-pull modulation scheme is implemented without introducing a peripheral circuit, so that modulation efficiency is improved, and a size of an electro-optic modulator is reduced.

In an optional implementation, first ends of the first electrode pair and the second electrode pair are separately connected to the signal output end of the radio frequency driver, and both second ends of the first electrode pair and the second electrode pair are connected to a resistor. The first electrode pair includes a first electrode and a second electrode, and the second electrode pair includes a third electrode and a fourth electrode. For example, the first electrode and the second electrode are respectively located on two sides of the first branch and the second branch, and the third electrode and the fourth electrode are located between the first branch and the second branch. The first electrode, the second electrode, the third electrode, and the fourth electrode may adopt an input manner of S+S− and S−S+, so that a direction of an electric field applied to the first branch by the first electrode pair is opposite to a direction of an electric field applied to the second branch by the second electrode pair, and a polarization direction of the first branch is the same as a polarization direction of the second branch. In this way, the first electrode pair and the second electrode pair are connected in parallel. A manner of connection between positive and negative electrodes of the first electrode pair and the second electrode pair may be adjusted to change directions of electric fields of the first electrode pair and the second electrode pair, so that a phase of an optical signal finally output from the first branch is opposite to a phase of an optical signal finally output from the second branch, that is, a push-pull modulation scheme is implemented. Therefore, modulation efficiency is improved, and a size of an electro-optic modulator is reduced.

In an optional implementation, first ends of the first electrode pair and the second electrode pair are separately connected to the signal output end of the radio frequency driver, and both second ends of the first electrode pair and the second electrode pair are connected to a resistor. The first electrode pair includes a first electrode and a second electrode, and the second electrode pair includes a third electrode and a fourth electrode. For example, the first electrode and the second electrode are respectively located on two sides of the first branch and the second branch, and the third electrode and the fourth electrode are located between the first branch and the second branch. The first electrode, the second electrode, the third electrode, and the fourth electrode may adopt an input manner of S+S− and S+S−, so that a direction of an electric field applied to the first branch by the first electrode pair is the same as a direction of an electric field applied to the second branch by the second electrode pair, and a polarization direction of the first branch is opposite to a polarization direction of the second branch. In this way, the first electrode and the second electrode pair are connected in parallel, so that a direction of an electric field of the first electrode pair is the same as a direction of an electric field of the second electrode pair, and the polarization direction of the first branch is opposite to the polarization direction of the second branch, so that a phase of an optical signal finally output from the first branch is opposite to a phase of an optical signal finally output from the second branch, that is, a push-pull modulation scheme is implemented. Therefore, modulation efficiency is improved, and a size of an electro-optic modulator is reduced.

According to a second aspect of this application, an optical chip is provided, including a substrate and the foregoing electro-optic modulator, where the electro-optic modulator is disposed on a surface of the substrate. Therefore, the optical chip adopts the foregoing electro-optic modulator, which helps to reduce a size of the optical chip and facilitates packaging with another chip.

In an optional implementation, the optical chip further includes an input waveguide and an output waveguide, where the input waveguide is connected to an input end of the electro-optic modulator, and the output waveguide is connected to an output end of the electro-optic modulator. In this way, a to-be-modulated optical signal may be input by using the input waveguide, and a modulated optical signal may be output by using the output waveguide.

In an optional implementation, the optical chip further includes a photoelectric detector, where the photoelectric detector is connected to the output waveguide by using a connection waveguide, and the photoelectric detector is configured to detect a modulated optical signal. In this way, the photoelectric detector may be disposed to implement a small-sized optical chip that has higher integration, integrates receiving and transmitting, and has low costs.

According to a third aspect of this application, an integrated chip is provided, including an electrical chip and the foregoing optical chip, where the electrical chip is disposed on a surface of the optical chip, and the electrical chip is connected to the optical chip through welding by using a solder ball. In this way, a welded connection manner is adopted, which helps to simplify a circuit. In addition, a size of the optical chip is small, and a size of the integrated chip is reduced.

6

Figure 7:
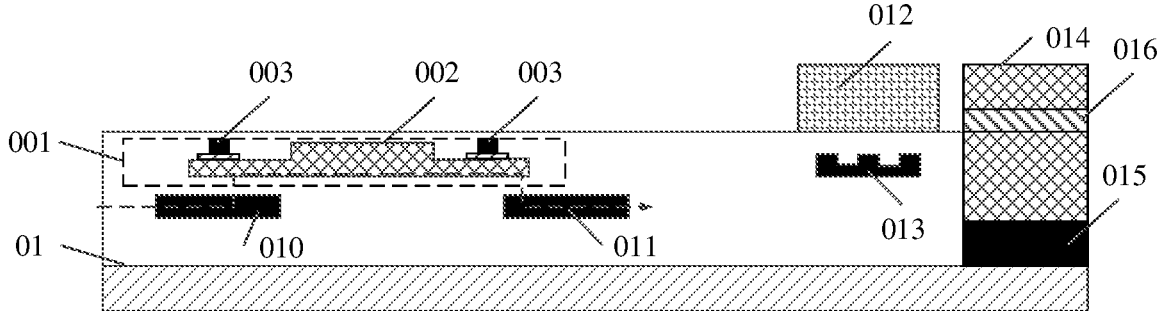
Figure 8:
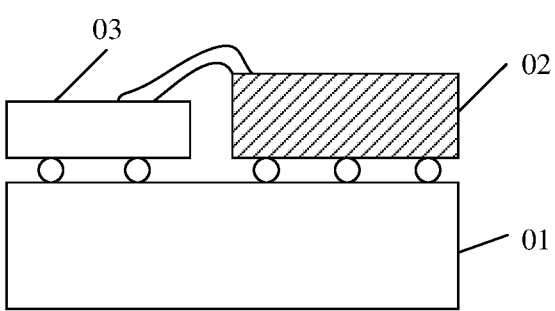

FIG. 7 is a schematic diagram of a structure of an optical chip according to an embodiment of this application;

FIG. 8 is a schematic diagram of a structure of an integrated chip; and

Figure 9:
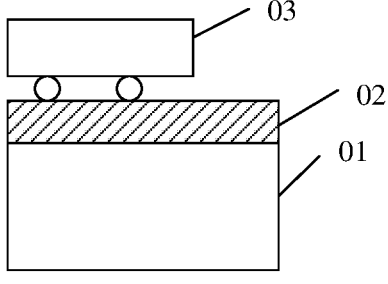

FIG. 9 is a schematic diagram of a structure of an integrated chip according to an embodiment of this application.

DESCRIPTION OF EMBODIMENTS

To make objectives, technical solutions, and advantages of this application clearer, the following further describes example embodiments in detail with reference to the accompanying drawings.

The terms "first" and "second" mentioned below are merely intended for purposes of description, and shall not be understood as an indication or implication of relative importance or implicit indication of a quantity of indicated technical features. Therefore, a feature limited by "first" or "second" may explicitly indicate or implicitly include one or more such features. In the descriptions of this application, unless otherwise stated, "a plurality of" means two or more than two.

In addition, in this application, directional terms such as "top" and "bottom" are defined relative to example locations of parts shown in the accompanying drawings. It should be understood that these directional terms are relative concepts and are used for relative description and clarification, and may correspondingly change based on a change in the locations of the parts shown in the accompanying drawings.

This application describes an electro-optic modulator, which may be used as a conversion interface for conversion from an electrical domain to an optical domain in an optical network, and is used in a communications system.

It should be noted that the optical network may be a wide area network, a metropolitan area network, or a newly created local area network with a wide range in which an optical fiber is used as a main transmission medium.

Figure 1:
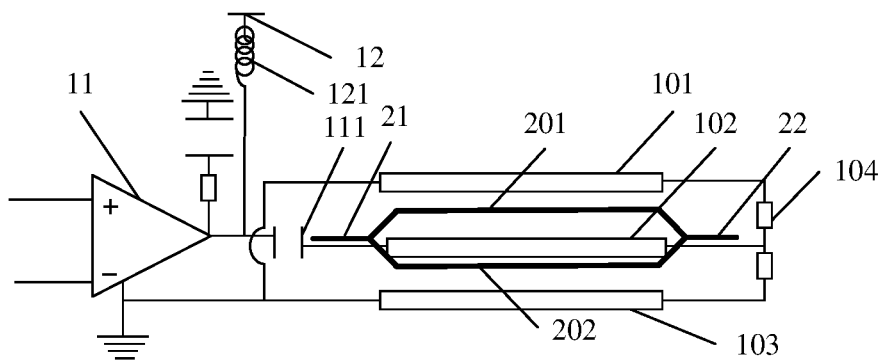
FIG. 1 is diagram of an equivalent circuit of an electro-optic modulator.

FIG. 1 is a schematic diagram of a structure of an electro-optic modulator. It should be noted that the electro-optic modulator is usually a semiconductor component. FIG. 1 is a diagram of an equivalent circuit of the semiconductor component. As shown in FIG. 1, the electro-optic modulator includes a first branch 202 and a second branch 201 that are symmetrically disposed, where an input end of the first branch 202 is connected to an input end of the second branch 201, and an output end of the first branch 202 is connected to an output end of the second branch 201.

For example, the electro-optic modulator may be a Mach-Zehnder modulator, and divides input light into two equal signals to respectively enter the first branch 202 and the second branch 201. The first branch 202 and the second branch 201 comprise an electro-optic material, for example, a lithium niobate material. A refractive index of the lithium niobate material varies with a magnitude of an externally applied electrical signal.

A first metal layer 101 and a second metal layer 103 are respectively disposed on two opposing sides of the first branch 202 and the second branch 201. A third metal layer 102 is disposed between the first branch 202 and the second branch 201. The first metal layer 101 and the third metal layer 102 form a first electrode pair, and the second metal layer 103 and the third metal layer 102 form a second electrode pair.

For example, a radio frequency input end 11 and a direct-current voltage end or terminal 12 are disposed on a side of an input end of the electro-optic modulator. The radio frequency input end 11 (that is, an output end of a driver of the electro-optic modulator) is configured to input a high-frequency modulated alternating-current electrical signal to the first electrode pair and the second electrode pair. The direct-current voltage terminal 12 is configured to input a direct-current bias electrical signal to the driver of the electro-optic modulator.

For example, the signal output end 11 of the radio frequency driver is connected to the first electrode pair and the second electrode pair by using a capacitor 111. The capacitor 111 is configured as a decoupling capacitor to filter out (not pass) a direct-current signal. The direct-current voltage terminal 12 is connected to a modulation electrode of the electro-optic modulator by using an inductor 121, and the inductor 121 is configured to filter out (not pass) a high-frequency signal.

A modulation signal input by the direct-current voltage terminal 12 may be separately coupled to the first branch 202 and the second branch 201 by using a capacitor structure 111 including the first electrode pair and the second electrode pair.

In the foregoing embodiment, for example, the first electrode pair and the second electrode pair adopt an alternating-current bias electrode. To implement that only a high-frequency alternating-current signal is input to the modulator and that only a direct-current signal is input to the signal output end 11, peripheral circuits such as the capacitor 111 and the inductor 121 are disposed between the signal output end 11 of the radio frequency driver, the direct-current voltage terminal 12, and the first electrode pair and the second electrode pair of the electro-optic modulator, to respectively obtain the direct-current signal and the high-frequency alternating-current signal. The peripheral circuit structure adds complexity, and the resulting device size is relatively large, which is not conducive to device miniaturization.

FIG. 8 is a schematic diagram of a structure of an integrated chip according to this application. As shown in FIG. 8, the integrated chip includes a substrate 01, an optical chip 02 and an electrical chip 03 that are disposed on the substrate. For example, the optical chip 02 adopts the electro-optic modulator shown in FIG. 1, and has a relatively large size. The optical chip 02 is connected to the electrical chip 03 by using a wire.

Figure 2:
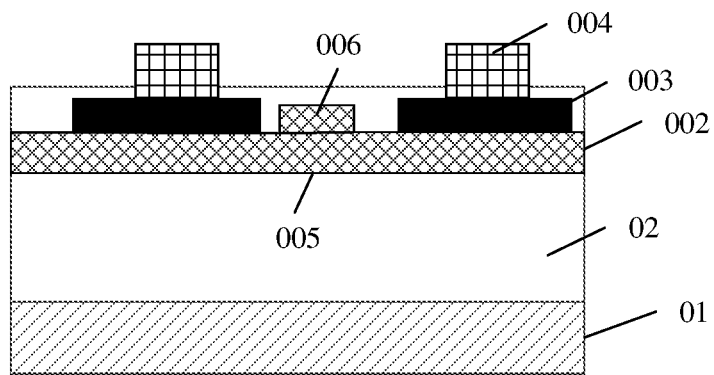
FIG. 2 is a schematic diagram of a structure of an electro-optic modulator according to an embodiment of this application.
Figure 3:
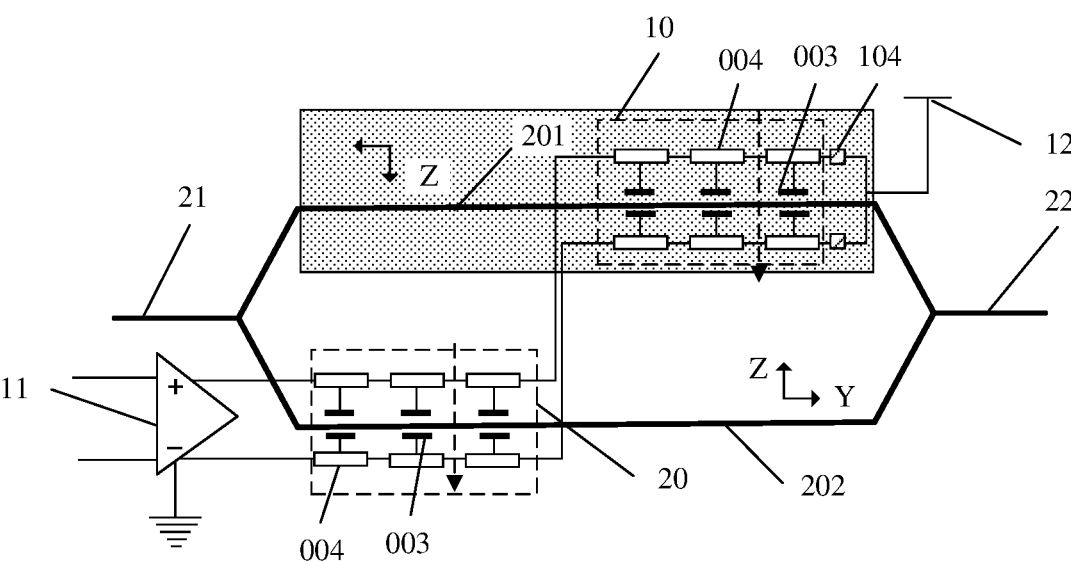
FIG. 3 is a diagram of an equivalent circuit of an electro-optic modulator according to an embodiment of this application.
Figure 3A:
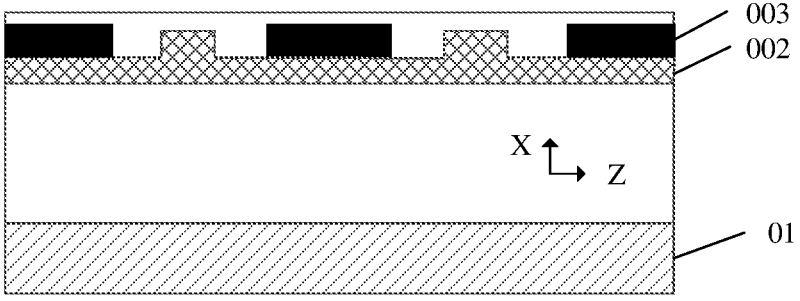
FIG. 3a is a schematic diagram of an X-cut structure of an electro-optic modulator according to an embodiment of this application.
Figure 3B:
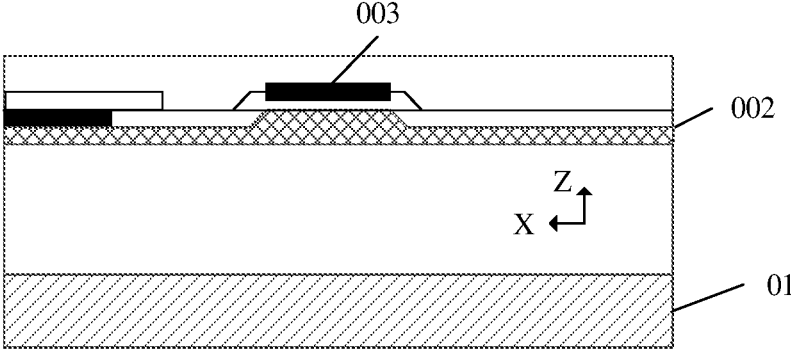
FIG. 3b is a schematic diagram of a Z-cut structure of an electro-optic modulator according to an embodiment of this application.
Figure 3C:
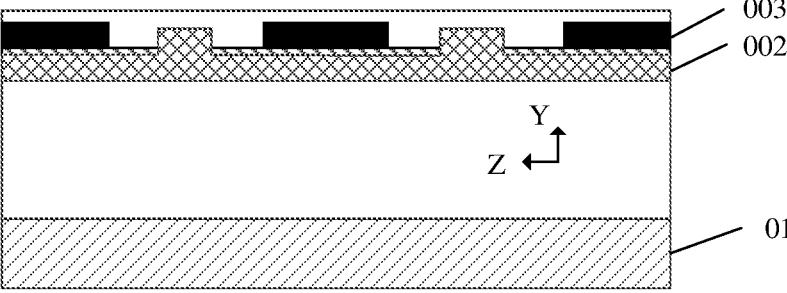
FIG. 3c is a schematic diagram of a Y-cut structure of an electro-optic modulator according to an embodiment of this application.
Figure 3D:
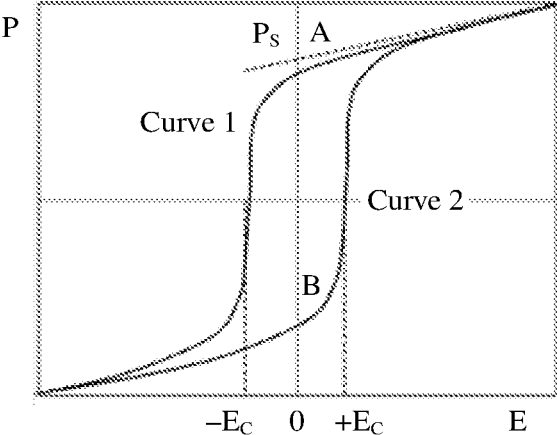
FIG. 3d is a diagram of an electric hysteresis curve of a lithium niobate material according to an embodiment of this application.

An embodiment of this application provides an electro-optic modulator. FIG. 2 is a schematic diagram of a structure of an electro-optic modulator according to an embodiment of this application. FIG. 3 is a diagram of an equivalent circuit of an electro-optic modulator according to an embodiment of this application. As shown in FIG. 2 and FIG. 3, the electro-optic modulator includes an optical waveguide layer 002 formed on the substrate 01, a modulation electrode 003 disposed on the optical waveguide layer 002, and a metal electrode 004 disposed on the modulation electrode 003 and electrically connected to the modulation electrode 003.

A first end of the metal electrode 004 is coupled to the signal output end 11 of the radio frequency driver.

The metal electrode 004 is configured to receive a modulation signal input by the radio frequency driver, and the modulation electrode is configured to perform electro-optic modulation on the optical waveguide layer based on the modulation signal.

A second end of the metal electrode 004 is coupled to the direct-current voltage terminal 12. The direct-current voltage terminal 12 is configured to input a voltage signal, and provides a bias voltage for the radio frequency driver by using the metal electrode 004.

It should be noted that the radio frequency driver includes at least a radio frequency signal output end and a bias voltage input end. For example, the radio frequency signal output end is coupled to the modulation electrode 003 by using the metal electrode 004. The radio frequency signal output end may output a radio frequency signal to the metal electrode 004. The modulation electrode 003 is configured to perform electro-optic modulation on the optical waveguide layer based on the modulation signal. The bias voltage input end may be coupled to the metal electrode 004, to receive, by using the metal electrode 004, a bias voltage that is output from the direct-current voltage terminal 12, and supply power to the radio frequency driver.

A specific manner of disposing the radio frequency signal output end and the bias voltage input terminal on the integrated circuit structure is conventional technology known by a person skilled in the art, and details are not described herein.

As shown in FIG. 3, the metal electrode 004 is continuously disposed on the substrate, and a plurality of different modulation electrodes 003 are discontinuously disposed. Therefore, a high-frequency modulation signal input by the radio frequency driver may be loaded onto a waveguide by using the modulation electrode 003, and is terminated at a terminal resistor 104. A direct-current voltage signal transmitted by the direct-current voltage terminal 12 may provide, by using the metal electrode 004, a bias voltage required for working to the radio frequency driver.

During working, the direct-current voltage terminal 12 supplies power to the radio frequency driver by using the metal electrode, so that the radio frequency driver starts to work, and then the radio frequency driver outputs a modulation signal. The metal electrode 004 receives the modulation signal input by the radio frequency driver, and the modulation electrode 003 performs electro-optic modulation on the optical waveguide layer based on the modulation signal.

According to the electro-optic modulator provided in this embodiment of this application, the modulation electrode is electrically connected to the signal output end of the radio frequency driver by using the metal electrode, and may receive, by using the metal electrode, a voltage signal that is input from the direct-current voltage terminal. In addition, the metal electrode is coupled to the direct-current voltage terminal, so that the metal electrode can be multiplexed to supply power to the radio frequency driver. The electro-optic modulator multiplexes the metal electrode, and supplies power to the driver of the electro-optic modulator through open-circuit direct-current coupling. A complex peripheral circuit does not need to be disposed in the circuit, which reduces costs and size of the electro-optic modulator, and is conducive to device miniaturization.

As shown in FIG. 2, the optical waveguide layer 002 includes an electro-optic crystal layer 005 parallel to the substrate, and a ridge waveguide 006 disposed on the same side as the electro-optic crystal layer 005 away from the substrate. The modulation electrodes 003 are disposed on the two respective sides of the ridge waveguide 006. The modulation electrodes 003 are configured to perform electro-optic modulation on a light wave transmitted by the ridge waveguide 006. In this way, the modulation electrodes 003 form a capacitor, and an electric field may be formed between the modulation electrodes 003 through capacitive coupling, to perform electro-optic modulation on the optical wave transmitted by the ridge waveguide 006.

It should be noted that the electro-optic crystal layer 005 and the ridge waveguide 006 may be integrally formed. For example, materials of the electro-optic crystal layer 005 and the ridge waveguide 006 are electro-optic materials, which are specifically lithium niobate materials. A refractive index of the lithium niobate material varies with a magnitude of an externally applied electrical signal.

In one example, a material of the substrate 01 is silicon (Si), and an insulation layer 02 is disposed on a surface of the substrate 01. In this example, a material of the insulation layer 02 is silicon dioxide. The optical waveguide layer 002 and the modulation electrode 003 are disposed in the insulation layer 02.

In some other embodiments of this application, still referring to FIG. 2, an opening is disposed on the insulation layer on a surface of the modulation electrode, and the metal electrode 004 is formed at the opening.

In this way, the modulation electrode 003 is disposed in the insulation layer, so that a short circuit during working of the modulation electrode 003 can be avoided.

As shown in FIG. 3, the optical waveguide layer includes a first branch 202 and a second branch 201 that are symmetrically disposed (that is, the ridge waveguide 006 in FIG. 2), and modulation electrodes (10 and 20 in FIG. 3) are disposed on two sides of each of the first branch 202 and the second branch 201.

An input end of the first branch 202 is connected to an input end of the second branch 201, and an output end of the first branch 202 is connected to an output end of the second branch 201.

The modulation electrodes are disposed on the two sides of each of the first branch 202 and the second branch 201, and are configured to modulate electric fields around the first branch 202 and the second branch 201, so that a phase of an optical signal that is output from the first branch 202 is opposite to a phase of an optical signal that is output from the second branch 201. A first end of the modulation electrode is coupled to the input ends 21 of the first branch 202 and the second branch 201, and a second end of the modulation electrode is coupled to the output ends 22 of the first branch 202 and the second branch 201. The second end of the modulation electrode is connected to a terminal resistor 104.

The terminal resistor 104 may be two resistors connected in series. For example, a resistance value is 32.5 ohms.

That a phase direction of the first branch 202 is opposite to a phase direction of the second branch 201 includes: A polarization direction of the first branch 202 is the same as a polarization direction of the second branch 201, and directions of electric fields applied to the first branch 202 and the second branch 201 by a modulation electrode pair may be adjusted, so that a direction of an electric field of the first branch 202 is opposite to a direction of an electric field of the second branch 201, and the phase direction of the first branch 202 is opposite to the phase direction of the second branch 201.

Alternatively, directions of externally applied electric fields applied to the first branch 202 and the second branch 201 by a modulation electrode pair are the same, and the polarization direction of the first branch 202 is opposite to the polarization direction of the second branch 201, so that the phase direction of the first branch 202 is opposite to the phase direction of the second branch 201.

For example, the first branch 202 and the second branch 201 adopt electro-optic materials, which are specifically lithium niobate materials. A refractive index of the lithium niobate material varies with a magnitude of an externally applied electrical signal.

Polarization directions of the first branch 202 and the second branch 201 are not limited in this embodiment of this application. In an implementation of this application, as shown in FIG. 2, the first branch 202 and the second branch 201 may adopt a structure that is made on a Z-cut lithium niobate substrate and in which light is transmitted along a Y direction.

In another implementation of this application, as shown in FIG. 3_a_, the first branch 202 and the second branch 201 may alternatively adopt a structure that is made on an X-cut lithium niobate substrate and in which light is transmitted along a Z direction.

In another implementation of this application, as shown in FIG. 3_b_, the first branch 202 and the second branch 201 may alternatively adopt a structure that is made on a Z-cut lithium niobate substrate and in which light is transmitted along an X direction.

In another implementation of this application, as shown in FIG. 3_c_, the first branch 202 and the second branch 201 may alternatively adopt a structure that is made on a Y-cut lithium niobate substrate and in which light is transmitted along a Z direction.

It should be noted that lithium niobate is a good ferroelectric material, and has features of spontaneous polarization and polarization by using an externally applied electric field. FIG. 3_d_ shows an electric hysteresis curve of a lithium niobate material. A horizontal coordinate is externally applied electric field strength E, a vertical coordinate is polarization strength P, and Ps is a polarization direction of the lithium niobate material in corresponding polarization strength. When a reverse electric field is externally applied to the lithium niobate material, a direction of spontaneous polarization tends to be reversed. When the externally applied electric field is strong enough, an ion overcomes a barrier, and makes a transition from one equilibrium position to another equilibrium position. Therefore, a polarization direction is reversed, and a change track follows a curve 1. In this case, the electric field strength is reduced, and the polarization strength changes following another curve 2, which is referred to as an electric hysteresis loop. When the electric field strength decreases to zero, spontaneous polarization still exists. In this case, the polarization direction changes from a point A to a point B, that is, the polarization direction is reversed. A voltage continues to be applied in a reverse direction, and the polarization strength becomes zero only when the field strength reaches a specific value. This voltage value is referred to as coercive field strength Ec.

In this embodiment of this application, a pulse voltage may be added to perform polarization on the second branch 201 of the electro-optic modulator, so that the polarization direction of the first branch 202 is opposite to the polarization direction of the second branch 201.

For example, a radio frequency signal may be first loaded onto the first branch 202 of the modulator. A direction of a loaded electric field is shown by an arrow in FIG. 23. A direction of an externally applied electric field is opposite to a direction "+Z". After the radio frequency signal is loaded onto ½ length of an equivalent modulation area, the electric field is converted to the second branch 201. The direction "+Z" after polarization is shown by an arrow pointing down, and the direction of the electric field is unchanged, so that the polarization direction of the first branch 202 is opposite to the polarization direction of the second branch 201.

In addition, for example, the electro-optic modulator further includes a signal output end 11 of a radio frequency driver (that is, an output end or terminal of a driver of the electro-optic modulator) and a direct-current voltage terminal 12. The signal output end 11 of the radio frequency driver is connected to a first end of the modulation electrode, and the signal output end 11 of the radio frequency driver is configured to input a modulation signal. The direct-current voltage terminal 12 is connected to a second end of the modulation electrode by using the terminal resistor 104, and the direct-current voltage terminal 12 is configured to input a direct-current bias electrical signal to the driver of the electro-optic modulator.

During working, an input light wave is divided into two equal light waves at a Y branch after passing through an input end of the electro-optic modulator, and the two equal light waves are respectively transmitted by using the first branch 202 and the second branch 201. Because the first branch 202 and the second branch 201 are made from electro-optic materials, and a refractive index of the electro-optic material varies with a magnitude of an externally applied electric field, a phase difference is generated when the two light waves arrive at a second Y branch.

A radio frequency signal that is input from the signal output end 11 of the radio frequency driver is directly coupled to the modulation electrode for electro-optic modulation. Electric field strength may be adjusted to change a phase difference between optical signals, to modulate the optical signal. Finally, the radio frequency signal is terminated on the terminal resistor 104 connected in series. In addition, a direct-current bias voltage may be loaded onto the terminal resistor 104, to supply power to the driver of the electro-optic modulator.

According to the electro-optic modulator provided in this embodiment of this application, the signal output end 11 of the radio frequency driver and the direct-current voltage terminal 12 are located at the two ends of the modulation electrode. The modulation electrode adopts a manner of open-circuit direct-current coupling. Compared with conventional single-terminal alternating-current coupling, filtering components such as a decoupling capacitor 111 and inductor 121 do not need to be disposed, and a peripheral circuit is greatly simplified. Under a premise that performance of the electro-optic modulator is not affected, integration of the electro-optic modulator may be further improved, and difficulty of a high-density package layout and wiring pressure can be effectively reduced, thereby facilitating co-packaging of chips. In addition, the modulation electrode adopts a symmetrical structure, so that chirp-free modulation can be implemented, and transmission quality of a signal can be ensured.

In addition, the electro-optic modulator performs modulation in a push-pull manner, so that a phase direction of the first branch 202 is opposite to a phase direction of the second branch 201, thereby improving modulation efficiency.

A specific structure of the modulation electrode is not limited in this embodiment of this application. In an implementation of this application, as shown in FIG. 2, the modulation electrode includes a first electrode pair 20 and a second electrode pair 10, where the first electrode pair 20 is disposed on two sides of the first branch 202, and the second electrode pair 10 is disposed on two sides of the second branch 201.

In an implementation of this application, a polarization direction of the first branch 202 is opposite to a polarization direction of the second branch 201. A direction of an electric field applied to the first branch 202 by the first electrode pair

20 is the same as a direction of an electric field applied to the second branch 201 by the second electrode pair 10. The electro-optic modulator is driven in a push-pull manner.

For example, as shown in FIG. 2, the first electrode pair 20 and the second electrode pair 10 are connected in series. A first end of the first electrode pair 20 is connected to the signal output end 11 of the radio frequency driver. A second end of the first electrode pair 20 is connected to a first end of the second electrode pair 10. A second end of the second electrode pair 10 is connected to a resistor, and the second end of the second electrode pair 10 is connected to the direct-current voltage terminal 12.

Still referring to FIG. 2, the first branch 202 and the second branch 201 each include a first part and a second part. The first part of the first branch 202 is opposite to the first part of the second branch 201, and the second part of the first branch 202 is opposite to the second part of the second branch 201.

The first electrode pair 20 is disposed on two sides of the first part of the first branch 202, and the second electrode pair 10 is disposed on two sides of the second part of the second branch 201. A polarization direction of the first branch 202 is opposite to a polarization direction of the second branch 201. A direction of an electric field applied to the first branch 202 by the first electrode pair 20 is the same as a direction of an electric field applied to the second branch 201 by the second electrode pair 10.

During working, a radio frequency signal is loaded onto the first electrode pair 20 of the electro-optic modulator by using the signal output end 11 of the radio frequency driver. A direction of an electric field applied to the first part of the first branch 202 by the first electrode pair 20 is shown by an arrow pointing down. In this case, an electric field is not loaded onto the first part of the second branch 201. Then the radio frequency signal is loaded onto the second electrode pair 10 of the electro-optic modulator. A direction of an electric field applied to the second part of the second branch 201 by the second electrode pair 10 is the same as the direction of the electric field applied to the first branch 202 by the first electrode pair 20. In this case, an electric field is not loaded onto the second part of the first branch 202. In this case, the polarization direction of the first branch 202 is opposite to the polarization direction of the second branch 201, so that a phase of an optical signal that is output from the first branch 202 is opposite to a phase of an optical signal that is output from the second branch 201. Therefore, a push-pull modulation scheme is implemented, and modulation efficiency is improved.

Figure 4:
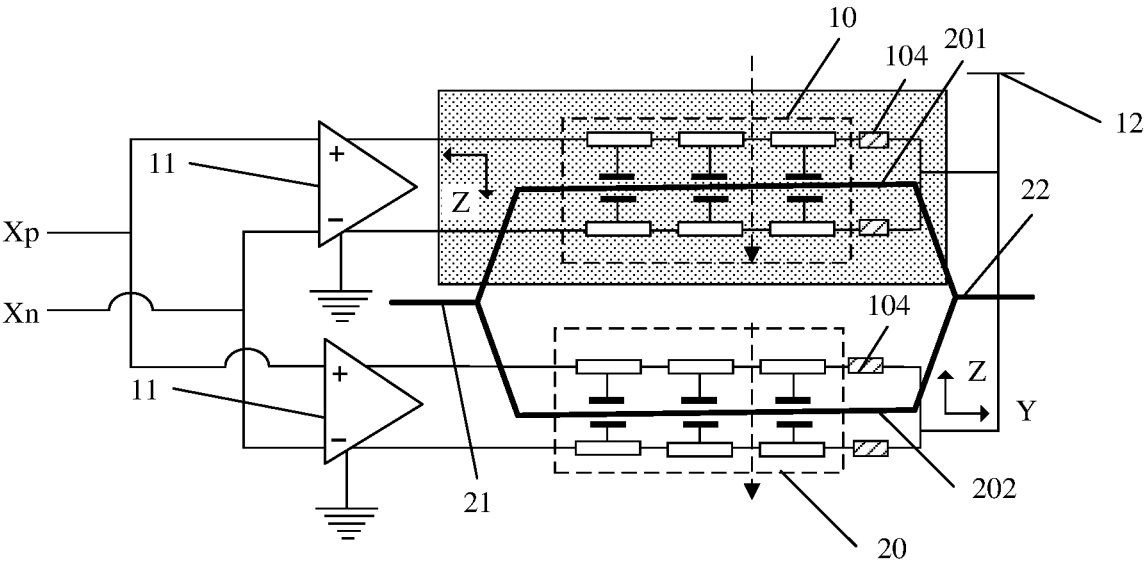
FIG. 4 is a diagram of an equivalent circuit of another electro-optic modulator according to an embodiment of this application.

For another example, as shown in FIG. 4, the first electrode pair 20 and the second electrode pair 10 are connected in parallel. Both a first end of the first electrode pair 20 and a first end of the second electrode pair 10 are connected to the signal output end 11 of the radio frequency driver. Both a second end of the first electrode pair 20 and a second end of the second electrode pair 10 are connected to a resistor. In addition, the second end of the first electrode pair 20 and the second end of the second electrode pair 10 are connected to the direct-current voltage terminal 12. A polarization direction of the first branch 202 is opposite to a polarization direction of the second branch 201.

A group of differential input signals is provided by the signal output end 11 of the radio frequency driver. The first electrode pair 20 and the second electrode pair 10 each include a first electrode and a second electrode. The first electrode of the first electrode pair 20 is located on an upper side of the first branch 202, and the second electrode of the first electrode pair 20 is located on a lower side of the first branch 202. The first electrode of the second electrode pair 10 is located on an upper side of the second branch 201, and the second electrode of the second electrode pair 10 is located on a lower side of the second branch 201.

The first electrode of the first electrode pair 20 is connected to a positive electrode of the signal output end 11 of the radio frequency driver, and the second electrode of the first electrode pair 20 is connected to a negative electrode of the signal output end 11 of the radio frequency driver. The first electrode of the second electrode pair 10 is connected to the positive electrode of the signal output end 11 of the radio frequency driver, and the second electrode of the second electrode pair 10 is connected to the negative electrode of the signal output end 11 of the radio frequency driver. A direction of an electric field applied to the first branch 202 by the first electrode pair 20 is the same as a direction of an electric field applied to the second branch 201 by the second electrode pair 10.

During working, a radio frequency signal is simultaneously loaded onto the first electrode pair 20 and the second electrode pair 10 of the electro-optic modulator by using the signal output end 11 of the radio frequency driver. A direction of an electric field applied to the first branch 202 by the first electrode pair 20 is shown by an arrow pointing down. A direction of an electric field applied to the second branch 201 by the second electrode pair 10 is shown by an arrow pointing down. The polarization direction of the first branch 202 is opposite to the polarization direction of the second branch 201, so that a phase of an optical signal that is output from the first branch 202 is opposite to a phase of an optical signal that is output from the second branch 201. Finally, the radio frequency signal is terminated on the terminal resistor 104.

In another implementation of this application, a polarization direction of the first branch 202 is the same as a polarization direction of the second branch 201. A direction of an electric field applied to the first branch 202 by the first electrode pair 20 is opposite to a direction of an electric field applied to the second branch 201 by the second electrode pair 10. The electro-optic modulator is driven in a push-pull manner.

Figure 5:
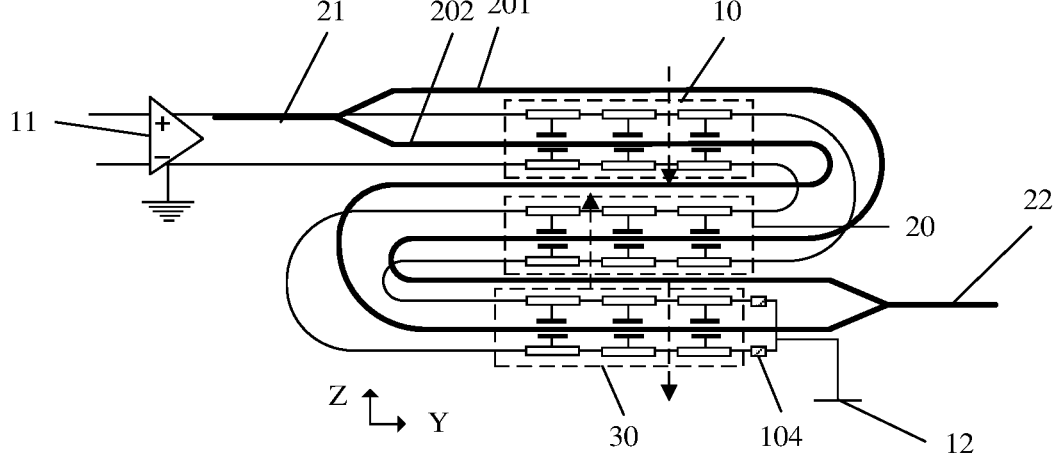
FIG. 5 is a diagram of an equivalent circuit of another electro-optic modulator according to an embodiment of this application.

As shown in a FIG. 5 implementation, the electro-optic modulator includes a first electrode pair 20, a second electrode pair 10, and a third electrode pair 30. The first electrode pair 20, the second electrode pair 10, and the third electrode pair 30 are connected in series. A first end of the first electrode pair 20 is connected to the signal output end 11 of the radio frequency driver. A second end of the first electrode pair 20 is connected to a first end of the second electrode pair 10. A first end of the third electrode pair 30 is connected to a second end of the second electrode pair 10. A second end of the third electrode pair 30 is connected to a resistor. The second end of the second electrode pair 10 is connected to the direct-current voltage terminal 12.

Both the first branch 202 and the second branch 201 are distributed in an S shape. The first branch 202 and the second branch 201 each include a first part, a second part, and a third part that are parallel to each other. The second part is located between the first part and the third part. The first electrode pair 20 is disposed on two sides of the first part of the first branch 202, the second electrode pair 10 is disposed on two sides of the second part of the second branch 201, and the third electrode pair 30 is disposed on two sides of the third part of the first branch 202. A direction of an electric field applied to the first branch 202 by the first electrode pair 20 is opposite to a direction of an electric field applied to the second branch 201 by the second electrode pair 10. A direction of an electric field applied to the first branch by the third electrode pair 30 is opposite to the direction of the electric field applied to the second branch 201 by the second electrode pair 10. A polarization direction of the first branch 202 is the same as a polarization direction of the second branch 201.

During working, a radio frequency signal is loaded onto the first electrode pair 20 of the electro-optic modulator by using the signal output end 11 of the radio frequency driver. A direction of an electric field applied to the first part of the first branch 202 by the first electrode pair 20 is shown by an arrow pointing down. In this case, an electric field is not loaded onto the first part of the second branch 201. Then, the optical path and the electric field go through a 180° turn, and the radio frequency signal is loaded onto the second electrode pair 10 of the electro-optic modulator with a turn of a waveguide and an electrode. A direction of an electric field applied to the second part of the second branch 201 by the second electrode pair 10 is shown by an arrow pointing up. In this case, an electric field is not loaded onto the second part of the first branch 202. Then, the optical path and the electric field go through a 180° turn again, and the radio frequency signal is loaded onto the third electrode pair 30 of the electro-optic modulator with a turn of the waveguide and the electrode. A direction of an electric field applied to the third part of the first branch 202 by the third electrode pair 30 is shown by an arrow pointing down. In this case, an electric field is not loaded onto the third part of the second branch 201. Finally, the radio frequency signal is terminated on the terminal resistor 104.

Figure 6:
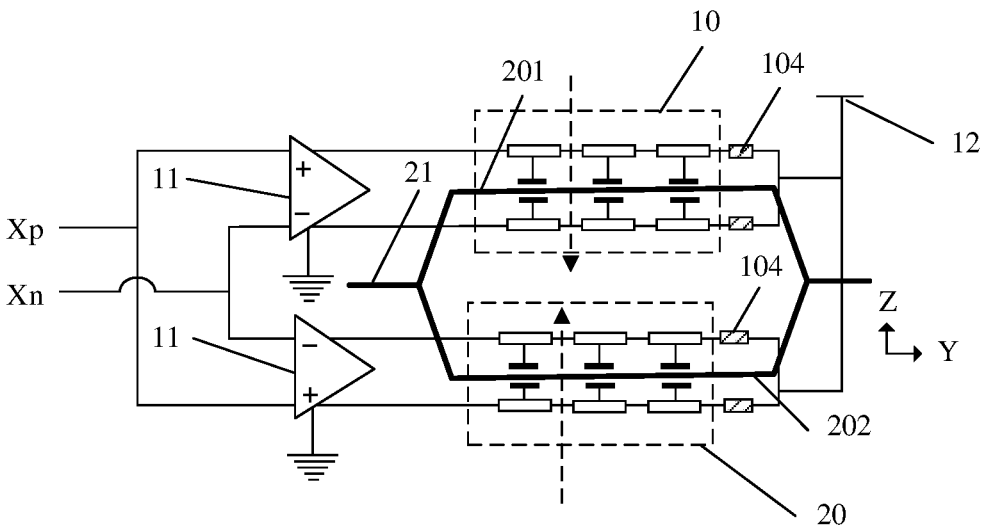
FIG. 6 is a diagram of an equivalent circuit of another electro-optic modulator according to an embodiment of this application.

In another implementation of this application, as shown in FIG. 6, the first electrode pair and the second electrode pair 10 are connected in parallel. A group of differential input signals is added to the signal output end 11 of the radio frequency driver, and an input manner of S+S− and S+S− is adopted. First ends of the first electrode pair 20 and the second electrode pair 10 are separately connected to the signal output end 11 of the radio frequency driver. Both second ends of the first electrode pair 20 and the second electrode pair 10 are connected to a resistor. The second ends of the first electrode pair 20 and the second electrode pair 10 are separately connected to the direct-current voltage terminal 12. A polarization direction of the first branch 202 is the same as a polarization direction of the second branch 201.

The first electrode pair 20 and the second electrode pair 10 each include a first electrode and a second electrode. The first electrode of the first electrode pair 20 is located on an upper side of the first branch 202, and the second electrode of the first electrode pair 20 is located on a lower side of the first branch 202. The first electrode of the second electrode pair 10 is located on an upper side of the second branch 201, and the second electrode of the second electrode pair 10 is located on a lower side of the second branch 201.

The first electrode of the first electrode pair 20 is connected to a positive electrode of the signal output end 11 of the radio frequency driver, and the second electrode of the first electrode pair 20 is connected to a negative electrode of the signal output end 11 of the radio frequency driver. The first electrode of the second electrode pair 10 is connected to the negative electrode of the signal output end 11 of the radio frequency driver, and the second electrode of the second electrode pair 10 is connected to the positive electrode of the signal output end 11 of the radio frequency driver. A direction of an electric field applied to the first branch 202 by the first electrode pair 20 is opposite to a direction of an electric field applied to the second branch 201 by the second electrode pair 10.

During working, a radio frequency signal is simultaneously loaded onto the first electrode pair 20 and the second electrode pair 10 of the electro-optic modulator by using the signal output end 11 of the radio frequency driver. A direction of an electric field applied to the first branch 202 by the first electrode pair 20 is shown by an arrow pointing down. A direction of an electric field applied to the second branch 201 by the second electrode pair 10 is shown by an arrow pointing up. The polarization direction of the first branch 202 is the same as the polarization direction of the second branch 201, so that a phase of an optical signal that is output from the first branch 202 is opposite to a phase of an optical signal that is output from the second branch 201. Finally, the radio frequency signal is terminated on the terminal resistor 104.

In the foregoing embodiments, through comparison, it may be found that the electro-optic modulator has features of small size, no peripheral circuit, being suitable for co-packaging, and the like.

An embodiment of this application further provides an optical chip. The optical chip may include a substrate 01, an electro-optic modulator and another component that are disposed on the substrate. The another component may be connected to the electro-optic modulator by using a connection waveguide.

The another component may be at least one of a laser diode, a semiconductor optical amplifier, and a photoelectric detector. It may be understood that there may be a plurality of components of one type on the same substrate, and the components may be connected in any required connection sequence.

FIG. 7 is a schematic diagram of a structure of an optical chip according to an embodiment of this application. As shown in FIG. 7, the optical chip includes a substrate 01, and an electro-optic modulator, an input waveguide 010, and an output waveguide 011 that are disposed on the substrate 01.

A material of a modulation electrode is not limited in this embodiment of this application. In an implementation of this application, the material of the modulation electrode 003 is a metal material such as copper (Cu) or zinc (Zn).

In another implementation of this application, the material of the modulation electrode 003 is a transparent conductive oxide (TCO), where the TCO has high conductivity and absorbs a relatively small amount of light. When the TCO replaces Au to serve as a lower-layer electrode, an electrode distance can be further shortened, so that electric field strength of a light field area is improved, thereby improving modulation efficiency of the electro-optic modulator. Compared with a length of a chip in a case of a conventional modulation electrode, a length of a corresponding chip for implementing same phase modulation is shortened, which helps to reduce chip size.

For example, the optical chip further includes a light source 014 and a photoelectric detector 012. For example, the light source 014 and a silicon dioxide layer are disposed in parallel on a surface of the substrate 01. The photoelectric detector 012 is disposed on a surface of the silicon dioxide layer. The light source 014 is configured to emit light. The input waveguide 010 is configured to transmit, to the electro-optic modulator, the light emitted by the light source 014. The electro-optic modulator is configured to modulate the light emitted by the light source 014. The photoelectric detector 012 may be connected to the output waveguide 011 of the electro-optic modulator 001 by using a connection waveguide 013. The photoelectric detector 012 may detect a light signal modulated by the electro-optic modulator.

An embodiment of this application further provides an integrated chip, including an electrical chip and the foregoing optical chip.

An electro-optic modulator in the optical chip may have the structure shown in FIG. 2, FIG. 4, FIG. 5, or FIG. 6. The optical chip has a relatively small size and may be packaged with the electrical chip together through welding.

As shown in FIG. 9, the electrical chip is disposed on a surface of the optical chip, and the electrical chip is connected to the optical chip through welding by using a solder ball.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electro-optic modulator disposed on a surface of a substrate, the electro-optic modulator comprising:

an optical waveguide layer disposed on the substrate;

modulation electrodes disposed on the optical waveguide layer; and a dual-rail metal electrode disposed on and electrically connected to the modulation electrodes, a first end of the dual-rail metal electrode connected to a radio frequency driver, the dual-rail metal electrode being configured and connected to receive a modulation signal input from the radio frequency driver and apply the received modulation signal input to the modulation electrodes, the modulation electrodes configured to perform electro-optic modulation on the optical waveguide layer based on the modulation signal input, a second end of the dual-rail metal electrode electrically connected to a direct-current voltage terminal for supplying a direct-current bias voltage, the dual-rail metal electrode configured to carrying carry the direct-current bias voltage from the direct-current voltage terminal at the metal electrode second end to the radio frequency driver at the dual-rail metal electrode first end through direct-current coupling, the optical waveguide layer comprising:

an electro-optic crystal layer parallel to the substrate, and a ridge waveguide disposed on a side of the electro-optic crystal layer that is away from the substrate surface, the modulation electrodes configured to perform electro-optic modulation on a light wave transmitted by the ridge waveguide, the ridge waveguide comprising:

a first branch and a second branch that are symmetrically disposed, an input end of the first branch coupled to an input end of the second branch, an output end of the first branch coupled to an output end of the second branch, a first end of the modulation electrodes coupled to the input ends of the first branch and the second branch, and a second end of the modulation electrodes coupled to the output ends of the first branch and the second branch; and the first end of the modulation electrodes coupled to a signal output end of the radio frequency driver, the second end of the modulation electrode connected to a terminal resistor, and a phase of an optical signal that is output from the first branch opposite to a phase of an optical signal that is output from the second branch, wherein the modulation electrodes comprise a first electrode pair and a second electrode pair, the first electrode pair symmetrically disposed on first and second sides of the first branch, and the second electrode pair symmetrically disposed on first and second sides of the second branch, and wherein the dual-rail metal electrode is disposed on the first side and the second side of both the first branch and the second branch and is configured to provide a differential voltage to the first electrode pair and the second electrode pair.

2. The electro-optic modulator according to claim 1, further comprising: an insulation layer disposed on the surface of the substrate, wherein the optical waveguide layer and the modulation electrodes are located in the insulation layer, the insulation layer defining an opening on a surface of the modulation electrodes, the metal electrode being formed at the opening.

3. The electro-optic modulator according to claim 1, wherein the metal electrode is continuously disposed, and the modulation electrodes are discontinuously disposed.

4. The electro-optic modulator according to claim 1, wherein:

the optical waveguide layer comprises an electro-optic material, the first electrode pair is configured and connected to apply a direction of an electric field to the first branch that is the same as a direction of an electric field applied to the second branch by the second electrode pair, and a polarization direction of the first branch is opposite to a polarization direction of the second branch.

5. The electro-optic modulator according to claim 4, wherein:

a first end of the first electrode pair is configured to be connected to the signal output end of the radio frequency driver, a second end of the first electrode pair is connected to a first end of the second electrode pair, a second end of the second electrode pair is connected to a terminal resistor, the first branch and the second branch each comprise a first part and a second part, the first part of the first branch is opposite to the first part of the second branch, the second part of the first branch is opposite to the second part of the second branch, the first electrode pair is disposed on sides of the first part of the first branch, and the second electrode pair is disposed on sides of the second part of the second branch.

6. The electro-optic modulator according to claim 4, wherein:

first ends of the first electrode pair and the second electrode pair are configured to be separately connected to the signal output end of the radio frequency driver, both second ends of the first electrode pair and the second electrode pair are connected to a terminal resistor;

the first electrode pair comprises a first electrode and a second electrode, the second electrode pair comprises a third electrode and a fourth electrode, the first electrode and the second electrode are located on sides of the first branch and the second branch, the third electrode and the fourth electrode are located between the first branch and the second branch, the first electrode and the third electrode are connected to a positive electrode of the signal output end of the radio frequency driver, and the second electrode and the fourth electrode are configured to be connected to a negative electrode of the signal output end of the radio frequency driver.

7. The electro-optic modulator according to claim 1, wherein:

a direction of an electric field applied to the first branch by the first electrode pair is opposite to a direction of an electric field applied to the second branch by the second electrode pair, and a polarization direction of the first branch is the same as a polarization direction of the second branch.

8. The electro-optic modulator according to claim 7, wherein:

the modulation electrodes further comprises a third electrode pair, a first end of the first electrode pair is configured to be connected to the signal output end of the radio frequency driver, a second end of the first electrode pair is connected to a first end of the second electrode pair, a first end of the third electrode pair is connected to a second end of the second electrode pair, a second end of the third electrode pair is connected to a terminal resistor;

the first branch and the second branch each comprise a first part, a second part, and a third part that are distributed in an S shape and that are parallel to each other, the second part is located between the first part and the third part, the first electrode pair is disposed on two sides of the first part of the first branch, the second electrode pair is disposed on two sides of the second part of the second branch, the third electrode pair is disposed on two sides of the third part of the first branch, and a direction of an electric field applied to the first branch by the third electrode pair is opposite to a direction of an electric field applied to the second branch by the second electrode pair.

9. The electro-optic modulator according to claim 7, wherein:

first ends of the first electrode pair and the second electrode pair are separately connected to the signal output end of the radio frequency driver, both second ends of the first electrode pair and the second electrode pair are connected to a terminal resistor, the first electrode pair comprises a first electrode and a second electrode, the second electrode pair comprises a third electrode and a fourth electrode, the first electrode and the second electrode are located on sides of the first branch and the second branch, the third electrode and the fourth electrode are located between the first branch and the second branch, the first electrode and the fourth electrode are connected to a positive electrode of the signal output end of the radio frequency driver, and the second electrode and the third electrode are configured to be connected to a negative electrode of the signal output end of the radio frequency driver.

10. The electro-optic modulator according to claim 1, wherein the modulation electrodes comprises copper, zinc, or a transparent conductive oxide.

11. The electro-optic modulator of claim 1 wherein the modulation electrodes are configured to perform push-pull electro-optic modulation on the optical waveguide layer.

12. The integrated chip of claim 11 wherein the direct-current voltage terminal is configured to provide the bias voltage for the radio frequency driver through plural open-circuit direct-current coupling electrical paths that are free of DC-blocking capacitors.

13. An optical chip comprising:

a substrate, and an electro-optic modulator disposed on a surface of a substrate, the electro-optic modulator comprising:

an optical waveguide layer disposed on the substrate;

modulation electrodes disposed on the optical waveguide layer; and a dual-rail metal electrode disposed on and electrically connected to the modulation electrodes, a first end of the dual-rail metal electrode connected to a radio frequency driver, the dual-rail metal electrode being configured and connected to supply power to the radio frequency driver through a direct-current coupling free of inline DC blocking capacitors;

the dual-rail metal electrode configured to receive a modulation signal input from the radio frequency driver, the modulation electrode configured to perform electro-optic modulation on the optical waveguide layer based on the modulation signal input;

a second end of the dual-rail metal electrode connected to a direct-current voltage terminal, and the direct-current voltage terminal being configured to input a voltage and provide a direct-current bias voltage for the radio frequency driver through the dual-rail metal electrode, wherein the optical waveguide layer comprises: an electro-optic crystal layer parallel to the substrate, and a ridge waveguide disposed on a side of the electro-optic crystal layer that is away from the substrate surface, the modulation electrodes are configured to perform electro-optic modulation on a light wave transmitted by the ridge waveguide, the ridge waveguide comprising:

a first branch and a second branch that are symmetrically disposed, an input end of the first branch is coupled to an input end of the second branch, an output end of the first branch is coupled to an output end of the second branch, a first end of the modulation electrodes is coupled to the input ends of the first branch and the second branch, and a second end of the modulation electrodes is coupled to the output ends of the first branch and the second branch; and the first end of the modulation electrodes is coupled to a signal output end of the radio frequency driver, the second end of the modulation electrode is connected to a terminal resistor, and a phase of an optical signal that is output from the first branch is opposite to a phase of an optical signal that is output from the second branch, the modulation electrodes comprise a first electrode pair and a second electrode pair, the first electrode pair is symmetrically disposed on first and second sides of the first branch, and the second electrode pair is symmetrically disposed on first and second sides of the second branch, and wherein the dual-rail metal electrode is disposed on the first side and the second side of both the first branch and the second branch and is configured to provide a differential voltage to the first electrode pair and the second electrode pair.

14. The optical chip according to claim 13, further comprising an input waveguide and an output waveguide, wherein the input waveguide is connected to an input end of an optical waveguide layer, and the output waveguide is connected to an output end of the optical waveguide layer.

15. The optical chip according to claim 14, further comprising: a photoelectric detector connected to the output waveguide by using a connection waveguide, the photoelectric detector configured to detect a modulated optical signal.

16. An integrated chip comprising:

an electrical chip, and an optical chip, the electrical chip being disposed on a surface of the optical chip, the electrical chip being connected to the optical chip through welding by using a solder ball, the optical chip comprising a substrate and an electro-optic modulator disposed on a surface of a substrate, the electro-optic modulator comprising:

an optical waveguide layer disposed on the substrate;

modulation electrodes disposed on the optical waveguide layer; and a dual-rail metal electrode disposed on the modulation electrode and electrically connected to the modulation electrodes, a first end of the dual-rail metal electrode connected to a radio frequency driver;

the dual-rail metal electrode being configured to receive a modulation signal input from the radio frequency driver, the dual-rail metal electrode being connected to provide direct-current coupling to the radio frequency driver free of inline DC blocking capacitors, the modulation electrodes being configured to perform electro-optic modulation on the optical waveguide layer based on the modulation signal input;

a second end of the dual-rail metal electrode being configured to be coupled to a direct-current voltage terminal configured to input a voltage and provide a direct-current bias voltage for the radio frequency driver by using the dual-rail metal electrode;

wherein the optical waveguide layer comprises: an electro-optic crystal layer parallel to the substrate, and a ridge waveguide disposed on a side of the electro-optic crystal layer that is away from the substrate surface, the modulation electrodes are configured to perform electro-optic modulation on a light wave transmitted by the ridge waveguide, the ridge waveguide comprising:

a first branch and a second branch that are symmetrically disposed, an input end of the first branch is coupled to an input end of the second branch, an output end of the first branch is coupled to an output end of the second branch, a first end of the modulation electrodes is coupled to the input ends of the first branch and the second branch, and a second end of the modulation electrodes is coupled to the output ends of the first branch and the second branch; and the first end of the modulation electrodes is coupled to a signal output end of the radio frequency driver, the second end of the modulation electrode is connected to a terminal resistor, and a phase of an optical signal that is output from the first branch is opposite to a phase of an optical signal that is output from the second branch, the modulation electrodes comprise a first electrode pair and a second electrode pair, the first electrode pair is symmetrically disposed on first and second sides of the first branch, and the second electrode pair is symmetrically disposed on first and second sides of the second branch, and wherein the dual-rail metal electrode is disposed on the first side and the second side of both the first branch and the second branch and is configured to provide a differential voltage to the first electrode pair and the second electrode pair.

17. The integrated chip of claim 16 further comprising a radio frequency driver, the first end of the metal electrode is coupled to the radio frequency driver so that the first end of the modulation electrodes is coupled to the signal output end of the radio frequency driver.

\* \* \* \* \*